United States Patent [19]

Mak

[11] Patent Number: 4,779,134
[45] Date of Patent: Oct. 18, 1988

[54] APPARATUS AND METHOD FOR VIEWING OF MULTIPLE TELEVISION STATIONS AND SWITCHING AMONG THEM

[76] Inventor: Stephen M. Mak, 980 Stanford, Irvine, Calif. 92714

[21] Appl. No.: 55,429

[22] Filed: May 28, 1987

[51] Int. Cl.⁴ ............................................. H04N 5/268
[52] U.S. Cl. .................................... 358/181; 358/108; 358/185
[58] Field of Search ............... 358/181, 142, 183, 185, 358/108; 340/525

[56] References Cited

U.S. PATENT DOCUMENTS

| | | | |
|---|---|---|---|
| 3,079,462 | 2/1963 | Rosenthal | 358/142 X |
| 3,402,259 | 9/1968 | Takahashi | 358/139 |
| 3,511,926 | 5/1970 | Lami | 358/181 |
| 4,037,250 | 7/1977 | McGahan et al. | 358/108 |
| 4,266,242 | 5/1981 | McCoy | 358/183 X |
| 4,511,886 | 4/1985 | Rodriguez | 358/108 X |
| 4,673,974 | 6/1987 | Ito et al. | 358/108 |

FOREIGN PATENT DOCUMENTS

2082869  3/1982  United Kingdom ................. 358/108

OTHER PUBLICATIONS

B. Marsden, "Master Control Techniques", Nov. 24, 1959, pp. 84–94.
L. W. Germany, "The Design of Television Mobile Control Rooms", Dec. 1971, pp. 276–282.
H. Weedermann, "Rail Track Surveillance by Vestigial Light Cameras", 1981, pp. 339–342.

*Primary Examiner*—James J. Groody
*Assistant Examiner*—E. Anne Faris
*Attorney, Agent, or Firm*—Beehler, Pavitt, Siegemund, Jagger, Martella & Dawes

[57] ABSTRACT

A simple and inexpensive digital circuit is employed for selectively assigning television channels to be output to a plurality of small auxiliary television monitors and a main television monitor. Each of the television monitors is digitally tuneable. After the original channel numbers are selected by the user for display on the main monitor and on each of the auxiliary monitors, the user may designate a new channel to be displayed on the main monitor. The new channel may be one of the channels presently being viewed on one of the auxiliary monitors or may be one of the channels which is not yet displayed. In the case where the channel to be displayed on the main monitor is then being displayed on one of the auxiliary monitors, the circuit interchanges the channel displayed on the main monitor with that on the auxiliary monitor. In the case where the new channel is not displayed on any of the monitors, the new channel is displayed on the main monitor and the channel previously displayed on the main monitor is switched to one of the auxiliary monitors with the channel previously displayed on that auxiliary monitor being deleted. These switching functions are accomplished by a ring shift register in which the channel numbers of each of the auxiliary monitors are stored and manipulated. The new channel designated by the user as well as the old channel which was previously displayed on the main monitor are placed in corresponding registers which form a parallel chain with each other and one of the shift registers and the ring shifter. Control of sequencing is determined by a plurality of status flip-flops and by firmware control.

20 Claims, 3 Drawing Sheets

APPARATUS AND METHOD FOR VIEWING OF MULTIPLE TELEVISION STATIONS AND SWITCHING AMONG THEM

BACKGROUND OF THE INVENTION

1. Field of the Invention

The invention relates to the field of television and in particular to an apparatus and method whereby multiple television channels may be simultaneously displayed on a corresponding number of monitors, the channels being switched among the monitors by remotely initiated commands.

2. Description of the Prior Art

The use of multiple monitors is common in television studios where each monitor corresponds, for example, to a separate camera or other video source. The various sources are combined through large and expensive studio video editing and switching equipment to record or broadcast a single edited version.

In the case of ordinary television reception, the cost and complexity of such switching and multiple viewing is usually prohibitive. However, where in cases of necessity simultaneous reviewing of several television channels is necessary, this is usually accomplished through the use of independently controlled television monitors coupled to an antenna or cable beam spreader.

Even in such cases where the consumer's need can support the additional cost of the multiple monitors, there is no means for switching among the various monitors other than independently adjusting each monitor separately or for avoiding the cost of duplicate television receivers.

Remote switching of monitors is well known. Both sonic, ultrasonic and infrared remote hand-held units transmit either a channel switching command or a signature indicative of a specific channel to a receiving unit within the television monitor. The receiving unit will then electromechanically step through the channels, actuate an electromechanical solenoid to select a channel, or to digitally tune a channel. If a plurality of remote receivers was positioned to received the remote actuating signal, each monitor would tune to the same station and there would be no means for separately selecting a channel to be displayed on just one of the monitors or to switch channels among the monitors.

Therefore, what is needed is a cost-effective means to allow multiple monitor viewing within a consumer environment which is inexpensive and which can be manipulated by conventional remote selection commands.

BRIEF SUMMARY OF THE INVENTION

A simple and inexpensive digital circuit is employed for selectively assigning television channels to be displayed on a plurality of small auxiliary television monitors and a main television monitor. Each of the television monitors is digitally tuneable. After the original channel designations are selected by the user for display on the main monitor and on each of the auxiliary monitors, the user may designate a new channel to be displayed on the main monitor. The new channel may be one of the channels presently being viewed on one of the auxiliary monitors or may be one of the channels which is not yet displayed. In the case where the channel to be displayed on the main monitor is then being displayed on one of the auxiliary monitors, the circuit interchanges the channel displayed on the main monitor with that on the auxiliary monitor. In the case where the new channel is not displayed on any of the monitors, the new channel is displayed on the main monitor and the channel previously displayed on the main monitor is switched to one of the auxiliary monitors with the channel previously displayed on that auxiliary monitor being deleted. These switching functions are accomplished by a ring shift register in which the channel designations of each of the auxiliary monitors are stored and manipulated. The new channel designated by the user as well as the old channel which was previously displayed on the main monitor are placed in corresponding registers which form a parallel chain with each other and one of the shift registers and the ring shifter. Control of sequencing is determined by a plurality of status flip-flops and by firmware control.

More particularly the invention is a method for selecting among a plurality of tuneable output monitors comprising the steps of loading a plurality of registers with a corresponding plurality of channel numbers. Each register corresponds to one of the tuneable output monitors. The channels are displayed in the plurality of output monitors. Each output monitor displays the channel loaded within the corresponding register. A channel number is selected for assignment to a specific one of the output monitors. The plurality of registers is searched for the selected channel. The selected channel is displayed in the specific one of the plurality of output monitors. As a result, the plurality of output monitors may be simultaneously viewed according to user selection.

The method further comprises the steps of interchanging the selected channel from another one of the output monitors to the specific one of the output monitors, if the selected channel was previously displayed on the other one of the output monitors. The other one of the output monitors which previously displayed the selected channel, now displays the channel previously displayed by the specific one of the output monitors.

The method further comprises the step of deleting the displayed channel from one of the output monitors other than the specific channel, when the selected channel is not then being displayed by one of the output monitors. The channel, which was previously displayed in the specific one of the output monitors, is displayed in the other one of the output monitors from which the previously displayed channel was deleted.

In the step of loading the plurality of registers with the channel numbers to be displayed on the output monitors, the plurality of registers form a ring shift register and the step of loading loads the ring shift register serially.

The step of searching the plurality of registers for the selected channel comprises the step of ring shifting the channels loaded within the plurality of registers.

In the step of selecting a channel for assignment to the specific output monitor, the specific output monitor which is selected is a principal television monitor and the remaining output monitors for displaying the channels loaded into the plurality of registers are smaller auxiliary television monitors.

The invention is also a circuit for selectively displaying a plurality of channels comprising a main monitor, a plurality of auxiliary monitors, a new channel register for selectively storing a new channel to be displayed on the main monitor, an old channel register for selectively storing a previously selected channel displayed on the main monitor, and a plurality of shift registers arranged and configured into a ring shift register assembly. Each of the shift registers correspond to one of the plurality of auxiliary monitors. A control circuit is coupled to the new channel register, old channel register and the plurality of shift registers for control of the loading of channel designations within each of the registers and for controlling selection and display of the channel designations for selectively tuning the main monitor and the plurality of auxiliary monitors.

The circuit further comprises a corresponding plurality of output registers. Each output register is coupled to a corresponding one of the shift registers. The output registers are coupled to the plurality of auxiliary monitors. Each output register corresponds to one of the auxiliary monitors. The output registers are also coupled to the control circuit so that channel designations stored within the plurality of shift registers are selectively transferred to the plurality of output registers, and the designated channels contained within the output register are then displayed on the auxiliary monitors.

The control circuit comprises a circuit for determining when the old channel register circuit and plurality of shift registers are each loaded with user selected channel designations.

The circuit further comprises a corresponding plurality of output registers. Each output register is coupled to a corresponding one of the shift registers. The output registers are coupled to the plurality of auxiliary monitors. Each output register corresponds to one of the auxiliary monitors. The output registers are also coupled to the control circuit so that channel designations stored within the plurality of shift registers are selectively transferred to the plurality of output registers and the designated channels contained within the output register are then displayed on the auxiliary monitors.

The control circuit comprises a circuit for searching for a selected channel designation being displayed among the main monitor and plurality of auxiliary monitors. This circuit also displays the searched channel designation on the main monitor and displays the channel designation previously displayed on the main monitor on the one of the plurality of auxiliary monitors which previously displayed the searched channel designation.

The control circuit also comprises a circuit for searching channel designations stored within the old channel register circuit and the plurality of shift registers and, upon failing to find the searched channel designation, it displays the channel designation in the main monitor. The circuit displays the channel designation which was previously displayed on the main monitor in one of the plurality of auxiliary monitors. Finally the circuit deletes the channel designation previously displayed in the one of the plurality of auxiliary monitors and displays the previously displayed the channel designation from the main monitor.

The invention can still further be characterized as a circuit for displaying a plurality of user designated channels among a main monitor and a plurality of smaller auxiliary monitors comprising a circuit for selectively assigning the corresponding plurality of user designated channels to the main monitor and the plurality of auxiliary monitors, a circuit for receiving selection of a new user designated channel, a circuit for searching among the previously assigned user designated channels for the new user designated channels, and a circuit for selectively reassigning selected ones of the previously user designated channels and the new user designated channel to the main monitor and the plurality of auxiliary monitors for display of the channels on the monitors. As a result, multiple channels may be simultaneously viewed and switched among multiple monitors quickly and inexpensively.

The invention and its various embodiments can better be visualized by now turning to the following drawings.

The invention and its various embodiments may be better understood by now turning to the following detailed description.

DETAILED DESCRIPTION OF THE PREFERRED EMBODIMENTS

Figure 1:
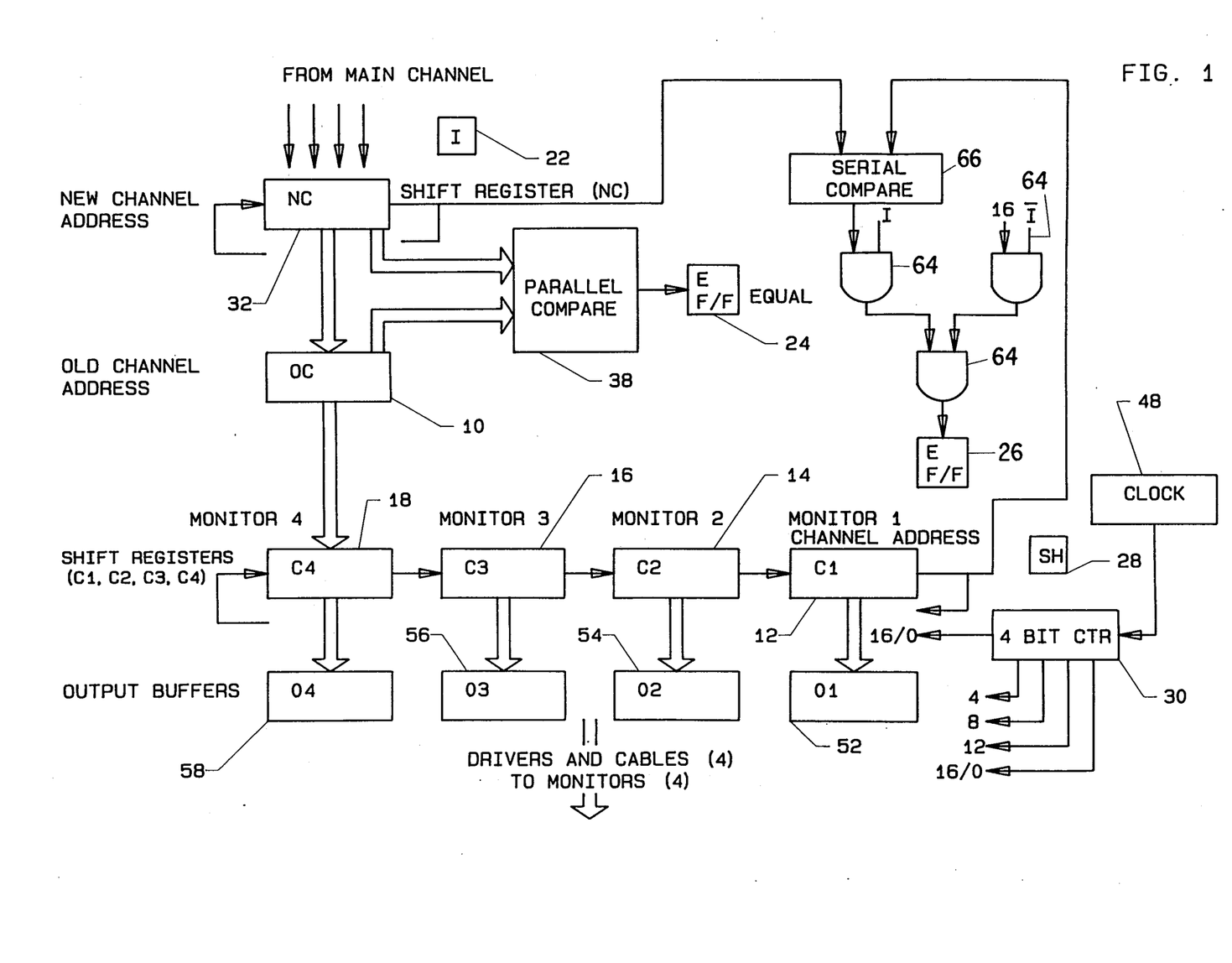
FIG. 1 is a block diagram of a circuit incorporating the invention and wherein the method of the invention may be practiced.

FIG. 1 is a diagrammatic block diagram of a portion of circuitry wherein the use of and switching among multiple television monitors can be inexpensively realized and wherein conventional remote channel codes can be utilized for channel selection. In the illustrated embodiment of FIG. 1, five television monitors are contemplated, a main monitor which will be tuned to the channel address contained within register 10 and four smaller conventional monitors (not shown), each of which will be tuned to the channel addressed in a corresponding register 12-18.

For example, the main monitor will be a conventional television which is digitally tuned on at least which can be tuned in response to a digital command through appropriate and conventional interfacing hardware. The main monitor will be the monitor principally used for viewing and thus will be the largest and most fully featured monitor, including stereo sound, color, and other adjustments directed to display performance.

The remaining four smaller monitors, which will be channel selected according to the contents of registers 12-18, will be small video monitors, without sound, and typically having a diagonal screen measurement of 5 inches or less. The smaller and more inexpensive monitors will be used for tracking channels which can later be selected for viewing.

Return now to the diagrammatic deepiction of FIG. 1. When the circuitry of FIG. 1 is first turned on, an initialization procedure is automatically effectuated through conventional firmware control. In the initialization step 20 of FIG. 2 the contents of all registers and flip-flops are reset to 0, in particular flip-flop 22 of FIG. 1 are reset, which can be symbolically represented as $I^{*1}=0$. As to the contents of each of the other registers of the circuit, namely the parallel compare flip-flop 24, E; serial compare/flag flip-flop 26, $e^*$; registers 12-18, C1, C2, C3, C4=0; shift register 28, SH=0; counter 30, CTR=0; old channel address register 10, OC=0; and new channel address register 32, NC=0.

*1. Throughout the remainder of the specification when a quantity is marked with an asterisk superscript, it shall be understood to be the logical complement of the quantity. In the convention used here, a quantity is true or set if it equals 1.

The viewer then enters the fivechannels which are to be viewed on the four small auxiliary monitors and on the main viewing monitor. For example, the viewer, with a conventional remote control device, selects Channel 5. The channel reception circuitry within the main monitor (not shown) receives the remotely transmitted signal at step 34 of FIG. 2 and through conventional algorithms implemented in conventional circuitry generates a digital output representative of the numeral "5" which is loaded into new channel (NC) register 32 at step 36 of FIG. 2. The contents of new channel (NC) register 32 and old channel (OC) register 10, which is zero, are then compared within a parallel comparator 38. Since in the example the two channels are unequal, the parallel comparator flip-flop 24 will be set, E=1. The steps are represented in the flow diagram of FIG. 2 as steps 40-44.

If the contents of new channel register 32 is equal to old channel register 10, the E flip-flop 24 is set to equal 1, otherwise it is reset to equal 0 at step 46. In any case the contents of shift flip-flop 28 are set, SH=1. Clock 48 is started or gated to four-bit counter 30 which causes the serial ring shifter comprised of C1-C4 registers 12-18 to shift four binary bits to the right, as depicted in FIG. 1, i.e to shift the contents of C4 register 18 to C3 register 16 and so forth, with the contents of C1 register 12 being recirculated and shifted into C4 register 18.

Figure 2:
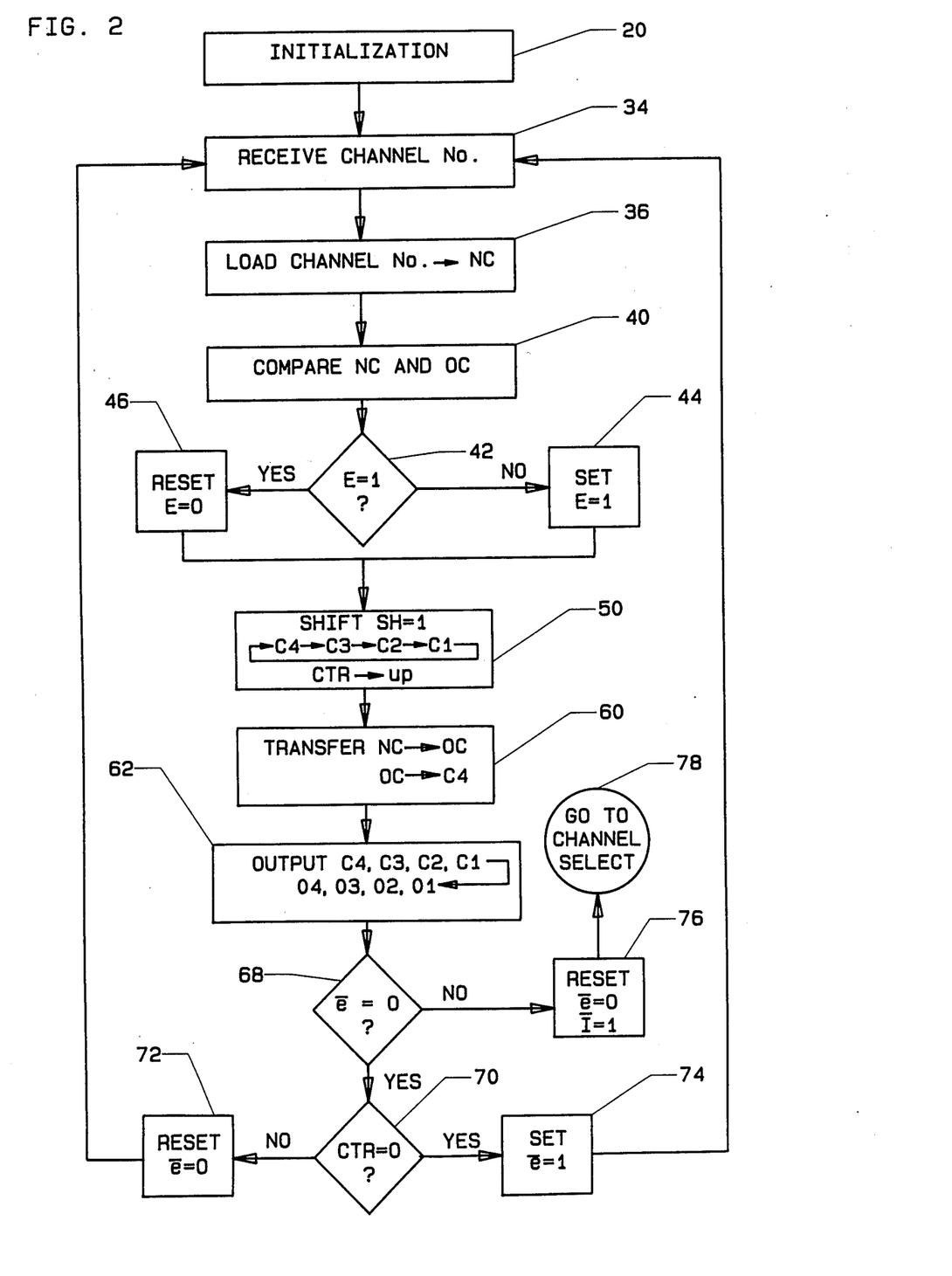
FIG. 2 is a flow diagram depicting the loading phase of the method of the invention generally and in particular in the circuit depicted in FIG. 1.

This is represented symbolically in the methodology of FIG. 2 at step 50.

Thereafter the contents of NC register 32 is shifted into the OC register 10 and simultaneously or just prior thereto, the contents of OC register 10 shifted into C4 register 18, symbolically denoted by step 60 in FIG. 2. After four bits have been shifted, the shift flip-flop 28 is reset, SH=0, and the clock count stops. The contents of the C1-C4 shift registers 12-18 are then output in parallel to O1-O4 output buffers 52-58, as symbolically denoted by step 62 of FIG. 2. The four small monitors will then be tuned to the contents of the corresponding O1-O4 registers 52-58, namely whatever is the contents of O4 register 58 will be the channel to which the fourth monitor will be tuned, and so forth, until the first monitor is tuned to the channel digitally contained within O1 register 52.

During this entire process, flag flip-flop 26 has been disconnected by means of logic gates 64 from serial compare register 66 whose operation is described below. Thus, during this initialization or loading procedure, serial compare register 66 plays no function. However, flag register 26 can be used to store a flag which is initially reset, e*=0, and which is tested at step 68 in FIG. 2. If the flag remains reset, then the contents of the counter 30 is checked at step 70. The four-bit counter will begin at 0 and count to 16 which is an overflow and thus again equivalent to 0. If the contents of counter 30 have not yet been returned to 16/0, flag flip-flop 26 is reset, if needed, at step 72 and the process returns ready to receive a new channel at step 34.

However, if the counter contents have reached zero, then the contents of flag flip-flop 26 are set, e*32 1, and then program processing is returned to the receive channel step 34. However, on the next pass through the methodology of FIG. 2, when step 68 is reached, the flag flip-flop will be set to e*=1 with the result that step 26 is executed, to wit, e* is rest to 0 and the initialization flip-flop 22, I* is set to 1. The load sequence indicated in FIG. 2 is then exited in favor of the channel select sequence at step 78 which is diagrammatically depicted in the flow diagram of FIG. 3.

Figure 3:
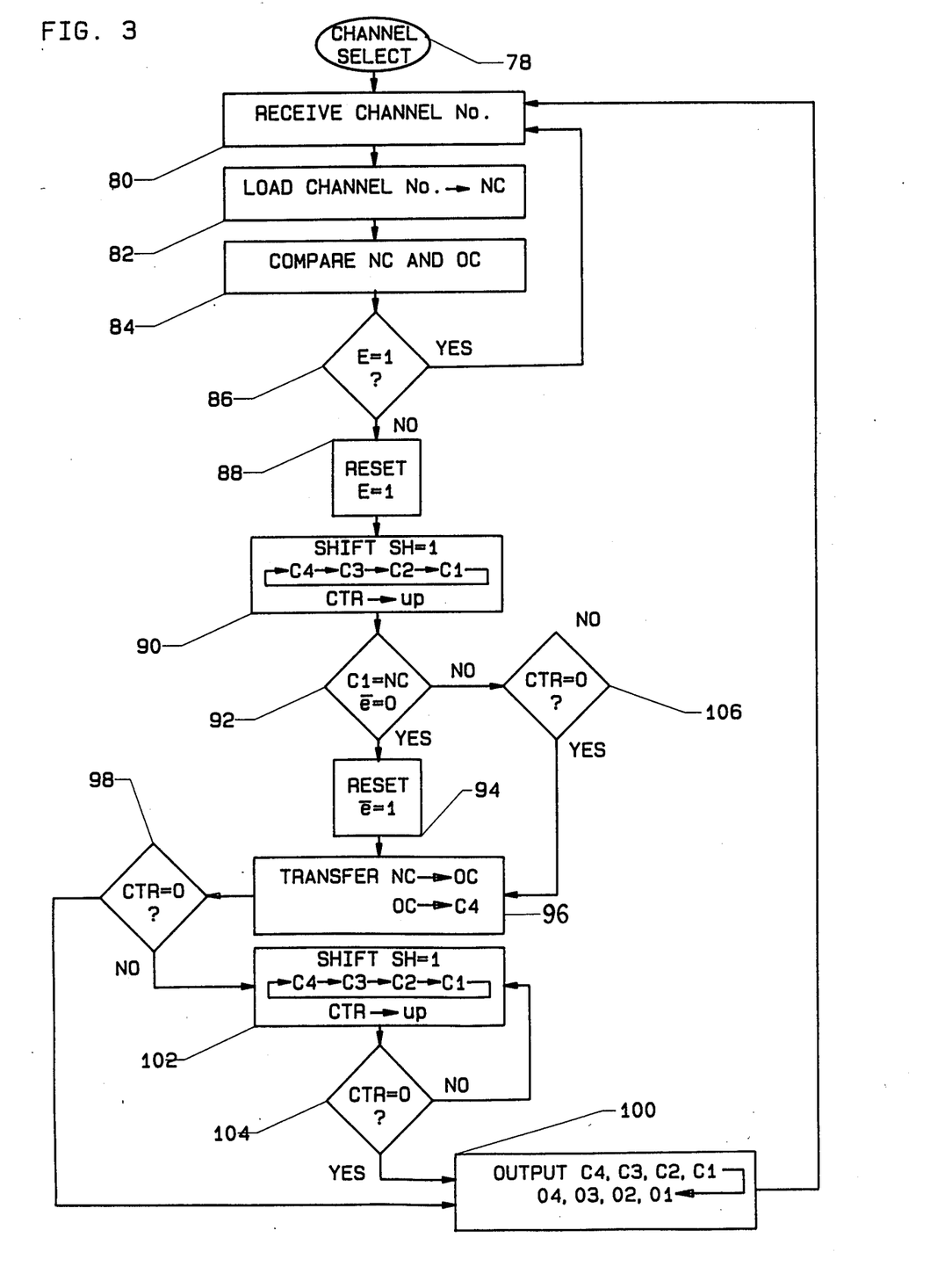
FIG. 3 is a flow diagram depicting the selection phase of the method of the invention generally and in particular in the circuit depicted in FIG. 1.

However, before turning to consider the channel select methodology of FIG. 3, consider the contents of the various registers and counters shown in FIG. 1 as the methodology of FIG. 2 is executed. THe progression and change of these contents is described in the context of the following example, and is summarized in Tables 1-5 below.

Initially each of the registers and flip-flops are set to 0. Assume, for example, as shown below in Table 1, that at phase 1a the channel 5 has been loaded into NC register 32 (steps 20-34,36). At this point the contents of OC register 10 are zero so that parallel compare circuitry 38 will cause E flip-flop 24 to be set, E=1 (steps 40,42,44,46).

TABLE 1

| PHASE | NC | OC | C4 C3 C2 C1 | O4 O3 O2 O1 E e* SH CTR I* |
|---|---|---|---|---|
| initial 0 | 0 | 0 0 | 0 0 0 0 0 0 | 0 0 0 0 0 |
| 1a load | 5 | 0 | 0 0 0 0 0 0 | 0 0 1 0 0 0 0 |
| 1b shift 5 | 0 | 0 0 | 0 0 0 0 0 0 | 1 0 1 → 4 0 |
| 1c x'fer 5 | 4 | 0 0 | 0 0 0 0 0 0 | 0 0 0 4 0 |
| 1d output 5 | 5 | 0 0 | 0 0 0 0 0 0 0 | 0 0 4 0 |

In phase 1b the contents of C1-C4 registers 12-18 will be shifted to the right by one register (step 50). As shown in phase 1b of Table 1, shift flip-flop 28 is set and the count goes from 0 to 4 within bit counter 30.

At phase 1c, as shown in Table 1, the contents of NC register 32 are transferred to OC register 10 and the contents of OC register 10 transferred to C4 register 18. However, register 10 and registers C1-C4 all have an initialized zero content so that despite the shifting of phase 1b and the transfer of phase 1c there is no net result in the contents of C1-C4 registers 12-18. At the end of phase 1c (step 60) the counter will have reached and stopped at a count of 4 and shift flip-flop 28 will be reset, SH=0. E flip-flop 24 will also be reset indicating that the contents of NC register 32 and OC register 10 are equal.

In phase 1d, as shown in Table 1, the contents of C1-C4 register 12-18 will be output to O4-O1 registers 52-58. Since these contents are all zero. The main monitor or television set will then be turned to the contents of OC register 10, namely channel 5, and the four smaller monitors will still be blank.

Now consider the continuation of the process as summarized in Table 2 below. Assume in phase 2a that the user remotely enters channel 2. A "2" will now be loaded in the NC register 32 as summarized in Table 2 at line 2a. Thereafter, C1-C4 registers 12-18 are again shifted leaving no net result since the contents of each is still zero. However, the counter now advances to 8.

TABLE 2

| PHASE | NC | OC | C4 | C3 | C2 | C1 | O4 | O3 | O2 | O1 | E | e* | SH | CTR | I* |
|---|---|---|---|---|---|---|---|---|---|---|---|---|---|---|---|
| 2a load | 2 | 5 | 0 | 0 | 0 | 0 | 0 | 0 | 0 | 0 | 1 | 0 | 0 | 4 | 0 |
| 2b shift | 2 | 5 | 0 | 0 | 0 | 0 | 0 | 0 | 0 | 0 | 1 | 0 | 1 | —>8 | 0 |
| 2c x'fer | 2 | 2 | 5 | 0 | 0 | 0 | 0 | 0 | 0 | 0 | 0 | 0 | 0 | 8 | 0 |
| 2d output | 2 | 2 | 5 | 0 | 0 | 5 | 0 | 0 | 0 | 0 | 0 | 0 | 0 | 8 | 0 |

In phase 2c of Table 2, 2 is shifted into OC register 10 and 5 is shifted into C4 register 18. At phase 2d of Table 2 the contents of C1–C4 registers 12–18 are transferred to O1–O4 registers 52–58 and channel 5 will appear at the first monitor with channel 2 appearing on the main monitor.

Consider now how the monitors are fully loaded by a continuation of the process as summarized in Tables 3–5 below. In particular, in Table 3, assume that the user now remotely enters channel 7 into NC register 32. At phase 3b the contents of C4 register 18 is shifted to C3 register 16 and bit counter 30 counts to 12. At phase 3c "2" is shifted into C4 register 18 and "7" is shifted into OC register 10. Channel 7 appears on the main monitor with channels 2 and 5 appearing on the fourth and third monitors. The count is stopped at 12.

TABLE 3

| PHASE | NC | OC | C4 | C3 | C2 | C1 | O4 | O3 | O2 | O1 | E | e* | SH | CTR | I* |
|---|---|---|---|---|---|---|---|---|---|---|---|---|---|---|---|
| 3a load | 7 | 2 | 5 | 0 | 0 | 0 | 5 | 0 | 0 | 0 | 1 | 0 | 0 | 8 | 0 |
| 3b shift | 7 | 2 | 0 | 5 | 0 | 0 | 5 | 0 | 0 | 0 | 1 | 0 | 1 | —>12 | 0 |
| 3c x'fer | 7 | 7 | 2 | 5 | 0 | 0 | 5 | 0 | 0 | 0 | 0 | 0 | 0 | 12 | 0 |
| 3d output | 7 | 7 | 2 | 5 | 0 | 0 | 2 | 5 | 0 | 0 | 0 | 0 | 0 | 12 | 0 |

As summarized at Table 4, assume that the user remotely enters channel 11. Now the counter counts up to 16/0 as C1–C4 registers 12–18 shift. Channel 11 will now appear on the main monitor with channels 7, 2 and 5 appearing on monitors 4 through 2, respectively.

TABLE 4

| PHASE | NC | OC | C4 | C3 | C2 | C1 | O4 | O3 | O2 | O1 | E | e* | SH | CTR | I* |
|---|---|---|---|---|---|---|---|---|---|---|---|---|---|---|---|
| 4a load | 11 | 7 | 2 | 5 | 0 | 0 | 2 | 5 | 0 | 0 | 1 | 0 | 0 | 8 | 0 |
| 4b shift | 11 | 7 | 0 | 2 | 5 | 0 | 2 | 5 | 0 | 0 | 1 | 0 | 1 | —>16 | 0 |
| 4c x'fer | 11 | 11 | 7 | 2 | 5 | 0 | 2 | 5 | 0 | 0 | 0 | 0 | 0 | 16 | 0 |
| 4d output | 11 | 11 | 7 | 2 | 5 | 0 | 7 | 2 | 5 | 0 | 0 | 1 | 0 | 0 | 0 |

Table 5 represents the entry of the last channel. Assume that the user now enters channel 9 into NC register 32. The clock will count to 4. Ultimately channel 9 will appear on the main monitor and channels 11, 7, 2 and 5 appears on monitors 4 through 1 respectively.

TABLE 5

| PHASE | NC | OC | C4 | C3 | C2 | C1 | O4 | O3 | O2 | O1 | E | e* | SH | CTR | I* |
|---|---|---|---|---|---|---|---|---|---|---|---|---|---|---|---|
| 5a load | 9 | 11 | 7 | 2 | 5 | 0 | 7 | 2 | 5 | 0 | 1 | 0 | 0 | 0 | 0 |
| 5b shift | 9 | 11 | 0 | 7 | 2 | 5 | 7 | 2 | 5 | 0 | 1 | 0 | 1 | —>4 | 0 |
| 5c x'fer | 9 | 9 | 11 | 7 | 2 | 5 | 7 | 2 | 5 | 0 | 0 | 0 | 0 | 4 | 0 |
| 5d output | 9 | 9 | 11 | 7 | 2 | 5 | 11 | 7 | 2 | 5 | 0 | 0 | 0 | 4 | 1 |

However, at phase 4d when the counter reached 0, the e* flag was set. So, as determined by step 68 in FIG. 2, after the output (step 62) included within phase 5d, the e* flag will be reset to 0 and the initialization flag I* will be set to 1, indicating that each of the channels is now fully loaded and all further the channel manipulation will proceed according the channel select methodology of FIG. 3.

It can now be very clearly visualized by the view of Tables 1–5 that what is being executed in a series of load, shift, transfer and output steps in a repetitive cycle until each of the output registers O1–O4 has been loaded with a channel number provided by the user. The user will now have a station displayed on his main monitor with four additional stations shown on the auxiliary monitors.

Assume now that the user desires to select one of the channels that are on the monitors. Referring to the channel select methodology beginning at step 78 in FIG. 3, a new channel is received at step 80, loaded into NC register 32 at step 82 and compared to the contents of OC register 10 at step 84 in a manner identical to the execution of steps 34, 36 and 40 in FIG. 2. The contents of the E flip-flop 24 are then examined at step 86. If the user has simply input a channel number which is already being exhibited on the monitor, no further action is executed, but the system merely waits for a new input. If, however, a different channel had been selected the E flip-flop 24 will be reset at step 88.

Continue with the specific example given above, i.e., channel 9 is on the main monitor with channels 5, 2, 7 and 11 being displayed on monitors 1–4. Assume that the user now wishes to see what is being displayed on the third monitor, namely channel 7. As summarized in Table 6 below, at phase 6a, "7" is loaded into NC register 32, compared as described above, and shifted as symbolically denoted at step 90 in FIG. 3. However, unlike the methodology of FIG. 2, the shift within C1–C4 registers 12–18 continues until the selected channel has been shifted through C1 register 12, and thus loaded into C4 register 18. At this point the shifting process stops. What stops the shifting process is e* flip-flop 26.

TABLE 6

| PHASE | NC | OC | C4 | C3 | C2 | C1 | O4 | O3 | O2 | O1 | E | e* | SH | CTR | I* |
|---|---|---|---|---|---|---|---|---|---|---|---|---|---|---|---|
| initial | 9 | 9 | 11 | 7 | 2 | 5 | 11 | 7 | 2 | 5 | 0 | 0 | 0 | 4 | 1 |
| 6a load | 7 | 9 | 11 | 7 | 2 | 5 | 11 | 7 | 2 | 5 | 1 | 0 | 0 | 4 | 1 |
| 6b shift | 7 | 9 | 7 | 2 | 5 | 11 | 11 | 7 | 2 | 5 | 1 | 1 | 1 | →12 | 1 |
| 6c x'fer | 7 | 7 | 9 | 2 | 5 | 11 | 11 | 7 | 2 | 5 | 0 | 1 | 0 | 12 | 1 |
| 6d shift | 7 | 7 | 11 | 9 | 2 | 5 | 11 | 7 | 2 | 5 | 0 | 0 | 1 | 16 | 1 |
| 6e output | 7 | 7 | 11 | 9 | 2 | 5 | 11 | 9 | 2 | 5 | 0 | 0 | 0 | 0 | 1 |

During the methodology of FIG. 3 gate 64 is activated to couple flag flip-flop 26 to serial compare 66. During the shifting process the contents of NC register 32 are shifted into serial compare circuit 66 as are the contents of C1 register 12. If the contents are equal, e* is set to 1. Otherwise e* is reset to zero. The contents of C1 register 12 are shifted into serial compare circuit 66 as they are shifted out of C1 register 12 into C4 register 18. Therefore, what is being compared in any given shift cycle is what were the contents of C1 register and what is now the contents of C4 register 18. The shift continues until the flag flip-flop 26 is set as tested at step 92 in FIG. 3 and implemented at step 94. In the illustrated embodiment this requires two shifts, or an eight-count so that the clock has now reached a count of 12.

After flag flip-flop 26 is set, the contents of NC register 32 is transferred to OC register 10 and the contents of OC register 10 transferred to the contents of C4 register 18 as before. In the illustrated example, the contents of each of the registers are summarized at phase 6c of Table 6.

However, after the transfer step of phase 6c of the shift is continued until it has been completely circulatory, i.e. until the counter has again reached 16/0. This is illustrated in the example in Table 6 at phase 6b wherein the contents of C1-C4 registers 12-18 have again shifted one to the right and the counter reached 16/0.

At phase 6e the contents of C1-C4 register 12-18 are output to O1-O4 registers 52-58, respectively, and the monitors will now show channel 7 on the main monitor with channels 5, 2, 9 and 11 shown on the auxiliary monitors.

Therefore, you will note in comparing the contents of output O1-O4 registers, phase 6e, with the contents at phase 6a that channel 9 has been replaced by channel 7. If the user selects one of the channels in the monitors, the methodology will result in the interchange between the main display monitor and the auxiliary monitor of the two channels previously displayed on those monitors. The remaining monitors will appear to the user as unchanged.

The transfer step of phase 6c is symbolically denoted in FIG. 3 as step 96, followed by a test of counter 30 and step 98. If, as in the example of Table 6, after a single shift cycle, the counter has reached 16/0, it is followed by an output step at phase 6e, symbolically denoted by step 100 in FIG. 3. Thereafter, the system is returned to its initial point and is ready to receive a new channel selection.

However, if at step 98 the counter for any reason had not yet reached 0, such as if channels 2 and 5 had instead been selected, the shifting process would have continued at step 102 until the counter had reached 0 as tested at step 104. Ultimately, the shifting cycle is completed to return each of the channels to their original monitor positions except for that channel which has been selected by the user and is replaced by the old channel content.

Assume now that instead of selecting a channel which is already on one of the monitors, a new channel is selected which is ot on any of the monitors. Assume, as summarized in Table 7 below that the user selects in phase 7a channel 4. A "4" is placed into NC register 32 and phase 7a. In phase 7b the counter will count through its entire 16 counts without finding a match to Channel 4 within any of the C1-C4 registers 12-18. in FIG. 3 the test of flag 26 at step 92 will thus always progress to step 106 where the contents of counter are tested and returned for further shifts at step 90 until the counter has been zeroed.

TABLE 7

| PHASE | NC | OC | C4 | C3 | C2 | C1 | O4 | O3 | O2 | O1 | E | e* | SH | CTR | I* |
|---|---|---|---|---|---|---|---|---|---|---|---|---|---|---|---|
| 7a load | 4 | 7 | 11 | 9 | 2 | 5 | 11 | 9 | 2 | 5 | 1 | 0 | 0 | 0 | 1 |
| 7b shift | 4 | 7 | 11 | 9 | 2 | 5 | 11 | 9 | 2 | 5 | 1 | 0 | 1 | →16 | 1 |
| 7c x'fer | 4 | 4 | 7 | 9 | 2 | 5 | 11 | 9 | 2 | 5 | 0 | 0 | 0 | 0 | 1 |
| 7d output | 4 | 4 | 7 | 9 | 2 | 5 | 7 | 9 | 2 | 5 | 0 | 0 | 0 | 0 | 1 |

After the counter has been zeroed, as summarized in phase C4 of Table 7, the contents of NC register 32 are shifted to OC register 10 and the contents of register 10 shifted to C4 register 18. At phase 70 of Table 7 the contents of C1-C4 registers 12-18 are shifted to O1-O4 registers 52-58 and in our example channel 4 will appear on the main monitor with channels 5, 2, 9 and 7 appearing on the auxiliary monitors. Thus, the user will see that when he selects a channel which is not on any of the monitors the newly selected channel will be placed on the main monitor, the channel which was previously displayed on the main monitor will be placed on the fourth monitor, and the channel which previously was on the fourth monitor deleted.

Furthermore, the invention need not be limited to a single main monitor and four auxillary monitors. Any number of auxillary monitors may be utilized as desired. The illustrated embodiment can be implemented with discrete circuit elements, or implemented in an integrated chip.

Many modifications and alterations may be made by those having ordinary skill in the art without departing from the spirit and scope of the invention. Thus, it must be expressly understood that the illustrated embodiment has been shown only for the purposes of example and should not be taken as limiting the invention which is defined in the following claims.

For example, in the illustrated embodiment each of the registers was considered as a four-bit register capable of storing the number 0-15. It is expressly contemplated that the capacity of these monitors and the design of the circuitry and methodology can be modified according to the present teachings to handle a greater number of channels. For example, if each of the monitors and clock were cycled to be six-bit monitors, any channel from zero through 63 could be accommodated. If the clock and registers instead based on an eight-bit module, up to 256 channels could be accommodated. This would more than accommodate all of the broadcast and cable channels available as well as a very large number of AM/FM radio broadcast stations or on-site videotape, audiotape, phonograph records, compact disks or laser disks outputs. Therefore, a digitally tuned stereo television using eight-bit registers could more easily accommodate all television, radio and home electronic entertainment, broadcasts, cable and information media for audiovisual output in a multi-monitor system.

I claim:

1. A method of delivering selected channel numbers to a plurality of tuneable output monitors comprising the steps of:
   loading a plurality of registers with a corresponding plurality of channel numbers, each register corresponding to one of said tuneable output monitors;
   outputting a video signal corresponding to each of said channel numbers to said plurality of output monitors, each output monitor dislaying said video signal corresponding to said channel number loaded within said corresponding register;
   selecting a channel number for assignment to a specific one of said output monitors;
   searching through said plurality of registers for said selected channel; and
   outputting a video signal corresponding to said selected channel number in said specified one of said plurality of output monitors,
   whereby said plurality of output monitors may be simultaneously viewed according to user selection.

2. The method of claim 1 further comprising the steps of:
   interchanging said selected channel number from another one of said output monitors to said specified one of said output monitors if said video signal corresponding to selected channel number was previously output to said other one of said output monitors, said other one of said output monitors, previously displaying a video signal corresponding to said selected channel, now displaying a video signal corresponding to said channel number previously selected for said specified one of said output monitors.

3. The method of claim 1 further comprising the steps of:
   deleting one of said channel numbers corresponding to one of said output monitors other than said specified one monitor corresponding to said previously selected chaannel, when said deleted channel is not then loaded into one of said registers corresponding to one of said output monitors; and
   displaying a video signal corresponding to said channel number previously displayed in said specified one of said output monitors in said other one of said output monitors from which said previously selected channel was deleted.

4. The method of claim 1 where in said step of loading said plurality of registers with said channel numbers to be output to said output monitors, said plurality of registers form a ring shift register and said step of loading, loads said ring shift register serially.

5. The method of claim 1 where in said step of searching said plurality of registers for said selected channel number comprises the step of ring shifting said channel numbers loaded within said plurality of registers.

6. The method of claim 1 where in said step of selecting a channel number for assignment to said specific output monitor, said specific output monitor selected is a principal television monitor and said remaining output monitors for displaying a video signal corresponding to said channel numbers loaded into said plurality of registers are smaller auxiliary television monitors.

7. A circuit for selectively displaying video signals corresponding to a plurality of channel numbers comprising:
   a main monitor;
   a plurality of auxiliary monitors;
   new channel register means for selectively storing a new channel whose corresponding video signal to be displayed on said main monitor;
   old channel register means for selectively storing a previously selected channel whose corresponding video signal is displayed on said main monitor;
   a plurality of shift registers arranged and configured into a ring shift register assembly, each of said shift registers corresponding to one of said plurality of auxiliary monitors; and
   control means coupled to said new channel register means, old channel register means and said plurality of shift registers for control of the loading of channel numbers within each of said registers and said register means and for controlling selection and output of said channel numbers for selectively tuning said main monitor and said plurality of auxiliary monitors.

8. The circuit of claim 7 further comprising a corresponding plurality of output registers, each output register coupled to a corresponding one of said shift registers, said output registers being coupled to said plurality of auxiliary monitors, each output register corresponding to one of said auxiliary monitors, said output registers also coupled to said control means so that channel numbers stored within said plurality of shift registers are selectively transferred to said plurality of output registers and video signals corresponding to said channel numbers contained within said output registers are then output to said auxiliary monitors.

9. The circuit of claim 7 wherein said control means comprises means for determining when said old channel register means and plurality of shift registers are each loaded with user selected channel numbers.

10. The circuit of claim 9 further comprising a corresponding plurality of output registers, each output register coupled to a corresponding one of said shift registers, said output registers being coupled to said plurality of auxiliary monitors, each output register corresponding to one of said auxiliary monitors, said output registers also coupled to said control means so that channel numbers stored within said plurality of shift registers are selectively transferred to said plurality of output registers and said channel numbers contained within said output registers are then output to said auxiliary monitors.

11. The circuit of claim 7 wherein said control means comprises means for searching for a selected channel number whose corresponding video signal is being displayed among said main monitor and plurality of auxiliary monitors, displaying a video signal corresponding to said searched channel number on said main monitor and displaying a video signal corresponding to said channel number previously output to said main monitor on said one of said plurality of auxiliary monitors previously displaying a video signal corresponding to said searched channel number.

12. The circuit of claim 8 wherein said control means comprises means for searching for a selected channel number whose video signal is being displayed among said main monitor and plurality of auxiliary monitors, for displaying a video signal corresponding to said searched channel number on said main monitor and for displaying a video signal corresponding to said channel number previously output to said main monitor on said one of said plurality of auxiliary monitors which previously displayed a video signal corresponding to said searched channel number.

13. The circuit of claim 10 wherein said control means comprises means for searching for a selected channel number whose corresponding vidio signal is being displayed among said main monitor and plurality of auxiliary monitors, for displaying a video signal corresponding to said searched channel number on said main monitor and for displaying a video signal corresponding to said channel number previously output to said main monitor on said one of said plurality of auxiliary monitors which previously displayed a video signal corresponding to said searched channel number.

14. The circuit of claim 7 wherein said control means comprises means for searching channel numbers stored within said old channel register means and within said plurality of shift registers, upon failing to find said searched channel number for displaying a video signal corresponding to said channel number in said main monitor, for displaying a video signal corresponding to said channel number previously output to said main monitor in one of said plurality of auxiliary monitors, and for deleting said channel number previously stored in said one of said auxiliary monitors.

15. The circuit of claim 8 wherein said control means comprises means for searching channel numbers stored within said old channel register means and within said plurality of shift registers and upon failing to find said searched channel number for displaying a video signal corresponding to said channel number in said main monitor, for displaying a video signal corresponding to said channel number previously output to said main monitor in one of said plurality of auxiliary monitors, and for deleting said channel number previously stored in said one of said auxiliary monitors.

16. The circuit of claim 11 wherein said control means comprises means for searching channel numbers stored within said old channel register means and within said plurality of shift registers and upon failing to find said searched channel number for displaying a video signal corresponding to said channel number in said main monitor, for displaying a video signal corresponding to said channel number previously output to said main monitor in one of said plurality of auxiliary monitors, and for deleting said channel number previously stored in said one of said auxiliary monitors.

17. The circuit of claim 10 wherein said control means comprises means for searching channel numbers stored within said old channel register means and within said plurality of shift registers and upon failing to find said searched channel nunbers for displaying a video signal corresponding to said channel number in said monitor, for displaying a video signal corresponding to said channel number previously output to said main monitor in one of said plurality of auxiliary monitors, and for deleting said channel number previouly stored in said one of said auxiliary monitors.

18. A circuit for displaying video signals corresponding to a plurality of user designated channels among a main monitor and a plurality of smaller auxiliary monitors comprising:
  means for selectively assigning the corresponding plurality of user designated channels to said main monitor and said plurality of auxiliary monitors;
  means for receiving selection of a new user designated channel;
  means for searching among said previously assigned user designated channels for said new user designated channels; and
  means for selectively reassigning selected ones of said previously user designated channels and said new user designated channel to said main monitor and said plurality of auxiliary monitors for display of a video signal corresponding to said channels on said monitors,
  whereby video signals corresponding to multiple channels may be simultaneously viewed and switched among multiple monitors quickly and inexpensively.

19. The circuit of claim 18 wherein said means for reassigning said user designated channels and said new user designated channel assigns said new user designated channel to said main monitor, and if said new user designated channel was included among said previous user designated channels, interchanges said previous user designated channel output to said main monitor and said new user designated channel previously output to one of said plurality of auxiliary monitors.

20. The circuit of claim 18 wherein said means for reassigning said user designated channels and said new user designated channel comprises means for assigning said new user designated channel to said main monitor, and if said new user designated channel was not among said previously output user designated channels, to delete one of said previously selected user designated channels and to assign said user designated channel previously selected for said main monitor to said auxiliary monitor which previously was assigned said deleted user designated channel.

* * * * *